United States Patent [19]
Bredol et al.

[11] Patent Number: 5,798,059
[45] Date of Patent: Aug. 25, 1998

[54] COLOR DISPLAY SCREEN COMPRISING A CONTRAST-ENHANCING PIGMENT

[75] Inventors: Michael Bredol, Münster; Jacqueline Merikhi; Dieter Wädow, both of Aachen, all of Germany

[73] Assignee: U.S. Philips Corporation, New York, N.Y.

[21] Appl. No.: 762,654

[22] Filed: Dec. 9, 1996

[30] Foreign Application Priority Data

Dec. 9, 1995 [DE] Germany .................. 195 46 011.1

[51] Int. Cl.$^6$ .................. H01J 1/62; C08K 3/30; C09K 11/00
[52] U.S. Cl. .................. 252/301.45; 252/301.4 R; 252/301.6 S; 313/467; 313/466; 313/468; 106/401; 106/419; 106/420; 106/426; 106/427
[58] Field of Search .................. 252/301.4 R, 301.6 S, 252/301.4 S; 106/420, 419, 426, 427, 401; 313/467, 466, 468

[56] References Cited

U.S. PATENT DOCUMENTS 4,086,123  4/1978  Hummel et al. .................. 106/293

FOREIGN PATENT DOCUMENTS

A2850491  5/1979  Germany .
4183777   6/1992  Japan .
4183778   6/1992  Japan .
4183779   6/1992  Japan .

*Primary Examiner*—Melissa Bonner
*Attorney, Agent, or Firm*—John C. Fox; Norman N. Spain

[57] ABSTRACT

A color display screen having a coating which comprises at least a greend an/or a red phosphor as well as at least a pigment having the following composition:

$$Ga_a In_b Zn_c Al_d O_n S_m Se_o Te_p$$

wherein
$0.05 < a < 1.95$  $0.0 \leq n < 0.3$
$0.05 < b < 1.95$  $2.1 < m \leq 3$
$0.00 \leq c < 0.09$  $0.0 \leq o < 0.3$
$0.00 \leq d < 0.2$  $0.0 \leq p < 0.3$ and $n+m+o+p=3$ and $a+b+\frac{2}{3}c+d=2$, yields a high-contrast and low-reflection picture, because the pigmentation in accordance with the invention is self-luminescent and its solid-solution properties enable its absorption properties to be accurately adapted to the emission spectrum of the phosphor. The solid solutions having the composition $Ga_a In_b Zn_c Al_d O_n S_m Se_o Te_p$ are characterized by steep absorption edges in the yellow-orange spectral range and by a high absorptivity. This permits thin pigment-containing layers and small quantities of pigment to be used.

10 Claims, 2 Drawing Sheets

COLOR DISPLAY SCREEN COMPRISING A CONTRAST-ENHANCING PIGMENT

BACKGROUND OF THE INVENTION

The invention relates to a color display screen, in particular a color display tube or a color monitor, comprising a coating which does not only contain a blue phosphor but also at least a green and/or a red phosphor as well as at least a contrast-enhancing pigment.

Color display screens and color monitors are often used in bright ambient light. To improve the visibility of the screen under these conditions and to reduce eye strain, the display screen should be non glaring, low in reflection and high in contrast.

The quality of the display screen is governed more by the contrast K than by its absolute brightness. The term contrast is to be understood to mean herein the difference between the highest and the lowest brightness. The contrast can be calculated from the ratio of the sum of the parasitic light intensity and the useful light intensity to the parasitic light intensity.

$$K=(I_{parasitic}+I_{useful})/I_{parasitic}$$

Ambient light having the intensity $I_{extern}$ is reflected at the phosphor layer and must pass twice through the glass of the display screen. The intensity of said ambient light is $I_{parasitic}=R_{screen} \times I_{extern} \times T^2$. In this equation, $R_{screen}$ is the reflection factor of the phosphor layer, and T is the transmission of the glass of the display screen.

The light emitted by the phosphor pixels, which has an intensity $I_{pix}$, passes through the glass once and, thus, produces the following useful light density $I_{useful}=I_{pix} \times T$. Not taking into account reflection and scattering losses, in practice the following contrast K is obtained $$K=(I_{extern} \times R_{screen} \times T^2+I_{pix} \times T)/I_{extern} R_{screen} \times T^2$$

The contrast can be maximized by reducing the influence of ambient light relative to the intrinsic light density of the phosphor pixels. This can be achieved in various ways. The transparency T of the glass of the display screen can be reduced. Alternatively, however, use can be made of color filters in the form of inorganic pigment substances which are selected in such a way as to pass the color emitted by the phosphor and absorb the other spectral fractions, so that diffuse reflection of ambient light is suppressed by a reduction of $R_{screen}$ at the phosphor powder.

The maximum degree of contrast is governed to an important extent by the spectral reflection of the pigment, which spectral reflection should be adapted to the emission properties of the associated phosphor. Consequently, a very important factor in choosing suitable pigments is the reflecting power. Apart from the particular reflecting power, many other properties are to be taken into account when choosing suitable pigments. For example, the pigment should not contain toxic elements, such as cadmium, lead and mercury. In addition, the pigment must be insoluble in water, because the phosphor is provided on the frontal area of the color display tube in the form of a suspension. Finally, also the temperature resistance is an important factor because the suspensions containing the phosphors are sintered at 450° C. to burn out the binders contained in the suspensions. Obviously, the pigment itself must not melt or change color in the sintering process. During operation of the color display tube, the pigment must be vacuum-resistant and electron-beam resistant.

Contrast-enhancing pigmentations for red and blue phosphors in color display screens are known per se. In DE-A-2850491 a description is given of a red-pigment coated color display screen substance which is composed of a color display screen material which is based on a rare-earth element and activated by europium and of a pigment which is made of indium sulphide or a combination of indium sulphide and an alkali sulphide. Hitherto, the pigmentation of green phosphors has not become normal practice. This can be attributed to the fact that the use of absorbing pigments in combination with green-emitting phosphors causes the luminance loss of green to be enhanced much more rapidly than the decline of the specific reflecting power, so that a relatively great loss of $I_{pix}$ takes place. In JP 4-183777, the pigment used for green phosphors of copper-doped zinc sulphide is cobalt blue (cobalt aluminate), in JP 4-183778, $TiO_2.CoO.Al_2O_3.LiO$ is used, and in JP 4-183779 ultramarine blue is used. These blue pigments cause a shift of the color coordinates of the copper-doped zinc sulphide to the blue region, as a result of which the color fidelity of the picture displayed is adversely affected.

OBJECTS AND SUMMARY OF THE INVENTION

Therefore, it is an object of the invention to provide a color display screen comprising a pigment in the coating of the display screen, which color display screen produces a high-contrast picture, and which combines a low external light reflectance, a high emission luminance and a good emission color quality, while the production costs are low.

In accordance with the invention, this object is achieved by a color display screen having a coating which comprises at least a green and/or a red phosphor as well as a pigment having the following composition:

wherein
0.05<a<1.95  0.0≦n<0.3
0.05<b<1.95  2.1<m≦3
0.00≦c<0.09  0.0≦o<0.3
0.00≦d<0.2  0.0≦p<0.3
and n+m+o+p=3 and a+b+⅔c+d=2.

A color display screen having such a pigmentation of the green and/or red phosphor(s) produces a high-contrast, low-reflection image as the solid-solution properties of the pigmentation in accordance with the invention enable the absorption properties of said pigmentation to be accurately adapted to the emission spectrum of the phosphor. The choice of the composition enables the absorption edges to be shifted throughout the range of the visible spectrum. The solid solutions of the composition $Ga_aIn_bZn_cAl_dO_nS_m$-$Se_oTe_p$ are characterized by steep absorption edges in the yellow-orange spectral range and by a high absorptivity. This permits thin pigment-containing layers and small quantities of pigment to be used. The pigments in accordance with the invention are easy to manufacture; the manufacturing technique is similar to that of the ZnS phosphors. The pigments are resistant to electron radiation, their vapor pressure is very low, their temperature resistance is sufficient and they are non-toxic.

Within the scope of the invention it may be preferred that the phosphor comprises a pigment-containing phosphor coating. This phosphor coating can be formed in a simple manner directly on the phosphor surface by means of co-precipitation.

It may alternatively be preferred, however, that the coating of the display screen comprises at least a phosphor layer having a green and/or a red phosphor-and at least a color filter layer containing the pigment. The use of pigments as non-scattering, ultrafine particles having grain sizes in the nanometer range enables transparent, separate color filter layers to be manufactured whose effectiveness is better than that of the pigment-coated phosphors.

A further aspect of the invention relates to a phosphor formulation, the phosphor being a green and/or a red phosphor and the phosphor coating containing a pigment of the composition

wherein
0.05<a<1.95  0.0≦n<0.3
0.05<b<1.95  2.1<m≦3
0.00≦c<0.09  0.0≦o<0.3
0.00≦d<0.2   0.0≦p<0.3
and n+m+o+p=3 and a+b+⅔c+d=2.

This phosphor formulation has the following advantages: band-gap absorption in a solid-solution system having steep absorption edges, a very high degree of absorption and adjustability of the color.

Preferably, the green phosphor has the composition ZnS:Cu,Al,Au, and the pigment has the composition

wherein
0.05<a<1.95  0.0≦n<0.3
0.05<b<1.95  2.1<m≦3
0.00≦c<0.09  0.0≦o<0.3
0.00≦d<0.2   0.0≦p<0.3
and n+m+o+p=3 and a+b+⅔c+d=2.

In combination with a suitable, bluish green pigment, this pigment forms a narrow, green transmission window.

It may alternatively be preferred that the green phosphor has the composition ZnS:Cu,Al, and that the pigment has the composition

wherein
0.05<a<1.95  0.0≦n<0.3
0.05<b<1.95  2.1<m≦3
0.00≦c<0.2   0.0≦o<0.3
0.00≦d<0.2   0.0≦p<0.3
and n+m+o+p=3 and a+b+⅔c+d=2.

It may further be preferred that the phosphor is a red phosphor and that the pigment has the composition

wherein
0.05<a<1.95  0.0≦n<0.3
0.05<b<1.95  2.1<m≦3
0.00≦c<0.09  0.0≦o<0.3
0.00≦d<0.2   0.0≦p<0.3
and n+m+o+p=3 and a+b+⅔c+d=2.

It may also be preferred that the phosphor is a red phosphor having the composition $Y_2O_2S$:Eu, and that the pigment has the composition

wherein
0.05<a<1.95  0.0≦n<0.3
0.05<b<1.95  2.1<m≦3
0.00≦c<0.09  0.0≦o<0.3
0.00≦d<0.2   0.0≦p<0.3
and n+m+o+p=3 and a+b+⅔c+d=2.

The solid-solution pigments in accordance with the invention can also be used as the pigment for coloring matter, lacquers, synthetic resins and inks.

These and other aspects of the invention will be apparent from and elucidated with reference to the embodiments described hereinafter.

DESCRIPTION OF THE PREFERRED EMBODIMENTS

Figure 1:
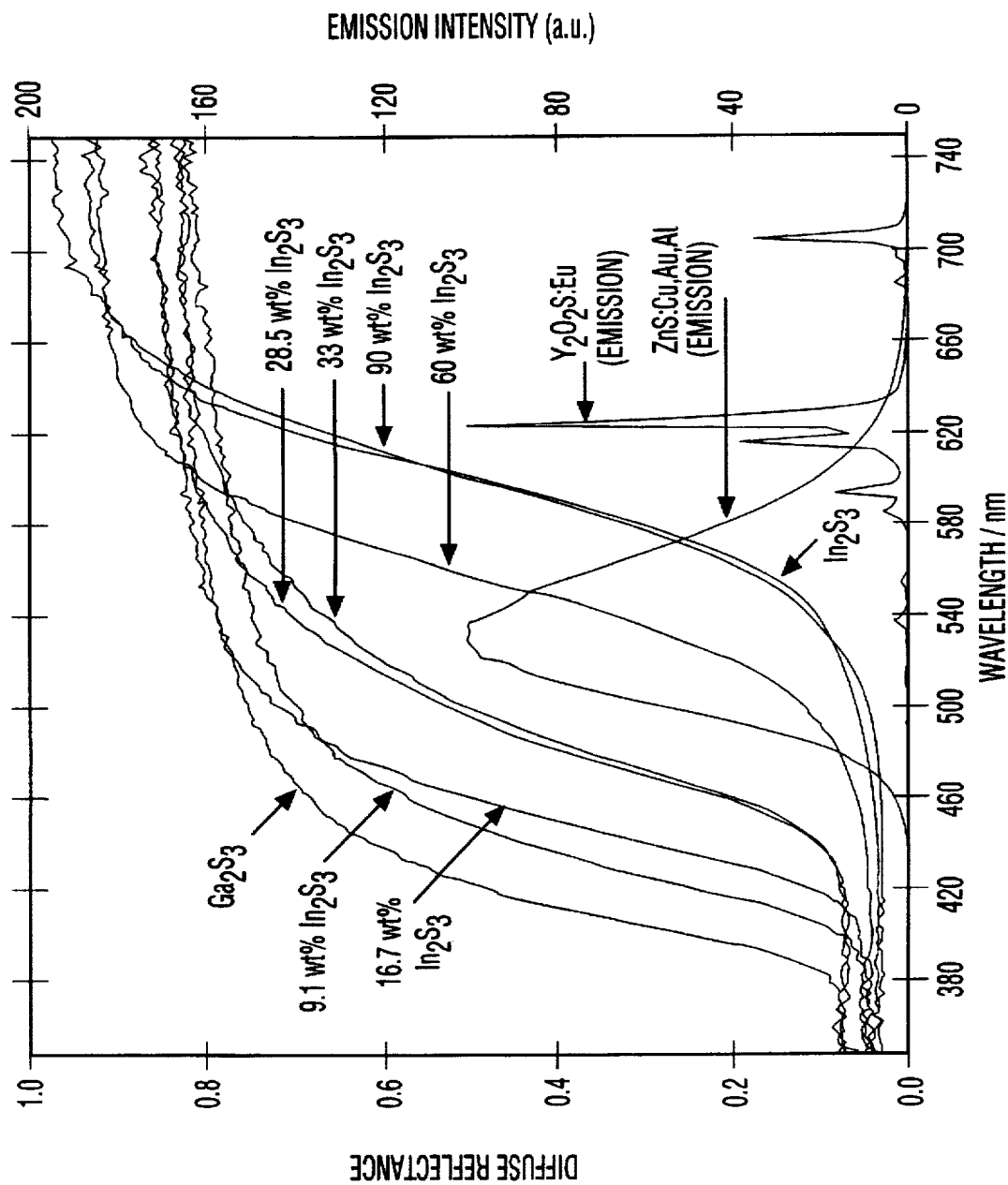
FIG. 1 shows the emission spectra of the green phosphor ZnS:Cu,Au,Al and of the red phosphor $Y_2O_2S$:Eu as well as the reflection spectra of solid-solution pigments in accordance with the invention and, for comparison, the reflection spectra of pure gallium sulphide and pure indium sulphide.

A color display tube comprises the so-called electron gun which includes the system for generating radiation and the system for focusing the rays for the three primary colors, i.e. red, blue and green, and a color display tube further comprises the beamdeflection system and the color display screen in an evacuated glass envelope. The phosphor coating is present on the inner surface of the color display screen. Said phosphor coating generally comprises a number of layers. The phosphors, which are contained in a layer, are arranged in a regular pattern of color points or color stripes which, upon excitation by an electron beam, luminesce in their primary colors red, green and blue.

The pigment, which serves to reduce the reflection of ambient light in the screen, can be incorporated in a separate color-filter layer between the phosphor layer and the screen glass or it can be used as a coating for the phosphor particles.

The structure of the color display screen coating may further comprise a black-matrix layer as well as a metal coating on the rear side.

For the green-emitting phosphor to be used in the color-display tube in accordance with the invention, use is preferably made of at least one phosphor which is selected from the group formed by: copper- and aluminium-activated zinc sulphide ZnS:Cu,Al; copper-activated zinc sulphide ZnS:Cu; copper- and aluminium-activated zinc cadmium sulphide (Zn, Cd)S:Cu,Al; the cadmium-sulphide content ranging from 1 to 15 wt. % with respect to the host material; copper-activated zinc cadmium sulphide (Zn, Cd)S:Cu, the cadmium-sulphide content ranging between 0.1 and 10 wt. % with respect to the host material; gold, copper- and aluminium- activated zinc suliphide ZnS:Au,Cu,Al and silver-activated zinc cadmium sulphide (Zn,Cd)S:Ag, the cadmium-sulphide content ranging from 30 to 50 wt % with respect to the host material. The above-mentioned (Zn,Cd)S:Cu phosphor and the ZnS-Cu phosphor may contain a trace of halogen. The ZnS:Au,Cu,Al phosphor may contain traces of halogen or bismuth and/or antimony.

In addition, the green rare earth metal phosphors emitting in a narrow band, for example terbium-activated $Y_2SiO_5$:Tb, LaOBr:Tb, $InBO_3$:Tb and the terbium-activated granates, for example, $Y_3Al_5O_{12}$:Tb and $Y_3(Al,Ga)_5O_{12}$:Tb can also suitably be used.

For the red-emitting phosphor to be used in the color-display screen in accordance with the invention, use is preferably be made of at least one phosphor selected from the group formed by: europium-activated phosphor on the basis of vanadate, borate, phosphate, however, in particular on the basis of oxysulphide or oxide, for example $Y_2O_2S:Eu$; $Y_2O_3:Eu$ and $YVO_4:Eu$, as well as europium-activated gadolinium oxide $Gd_2O_3:Eu$ and europium-activated gadolinium oxysulphide $Gd_2O_2S:Eu$. A further, suitable red-emitting phosphor is silver-activated zinc cadmium sulphide $(Zn,Cd)S:Ag$ having a high cadmium content.

The pigment for the coating of the fluorescent screen is predominantly composed of solid solutions of the chalcogenides of the elements indium, gallium, zinc and aluminium, which are defined by the general empirical formula

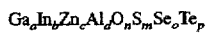

$$Ga_a In_b Zn_c Al_d O_n S_m Se_o Te_p$$

wherein
$0.05 < a < 1.95$  $0.0 \leq n < 0.3$
$0.05 < b < 1.95$  $2.1 < m \leq 3$
$0.00 \leq c < 0.09$  $0.0 \leq o < 0.3$
$0.00 \leq d < 0.2$  $0.0 \leq p < 0.3$
and $n+m+o+p=3$ and $a+b+\frac{2}{3}c+d=2$.

These solid solutions are derived from the $In_2S_3/Ga_2S_3$ solid-solution system, which forms a complete series of pseudo-binary solid solutions. The crystal structure of these solid solutions is based on a basic pattern of tetrahedrally coordinated gallium and indium atoms. In the simplest case, this results in the formation of a compound of the zinc-blende type or of the wurtzite type, in which, as a result of the stoichiometric ratios, approximately a third of the lattice sites in the metal sublattice remains free. The lattice vacancies can be randomly distributed or they can assume a specific order relative to each other; the resultant superstructures are manifold and generally lead to minor distortions of the basic lattice. This behavior is made clear by means of $Ga_2S_3$: a wurtzite variant ($\beta$-$Ga_2S_3$, statistically distributed lattice vacancies), a spalerite variant ($\gamma$-$Ga_2S_3$, statistically distributed lattice vacancies) and a slightly distorted wurtzite variant having a superstructure ($\alpha$-$Ga_2S_3$, monoclinic) coexist.

In the case of pure $In_2S_3$, the predominantly tetrahedral coordination of the metal is realized in a disordered spinel structure. $\beta$-$In_2S_3$ crystallizes in the $\gamma$-$Al_2O_3$ structure in which the S atoms are arranged in a close sphere packing in a cubical structure and the indium atoms occupy the tetrahedral and octahedral vacancies in a randomly distributed manner.

As a result of the affinity of the basic lattices and the prevailing pattern of the fourfold coordinated metal atoms, binary, ternary and quaternary, i.e. in general, multiple, solid-solution phases are often possible between gallium sulphide and indium sulphide as well as aluminium oxide, aluminium sulphide and the related II-VI-materials, such as in particular ZnS, but also ZnO, ZnSe and ZnTe.

The lattice vacancies, which are formally always present in the solidsolution structure of the pigments in accordance with the invention do not only give rise to the formation of solid solutions but also to many stable or metastable order phenomena. The systems between II-VI materials and III-VI materials also contain stable compounds, for example, having the composition $A''B'''_2C_4$, whose structure can be described, using the above-described basic lattices, by ordering the lattice vacancies and distorting the coordination. The plurality of polytypes and other compounds, which are described in the relevant literature, crystallize very slowly, and some of them require chemical transport means, for example iodine or iodide. The formation of said polytypes and other compounds can be avoided by means of the following methods of manufacturing the solid-solution pigments in accordance with the invention.

The properties of the solid solutions in accordance with the invention are subject to the mixing principle, i.e. the properties change continually with the composition. This enables the position of the absorption edges of the pigments to be optimized and the absorption spectrum of the pigment to be flexibly adjusted to the emission bands of the relevant phosphor by choosing a suitable composition. In particular as a constituent of a green pigment, an optimum adaptation also to phosphors emitting in a narrow band, for example terbium-activated phosphors such as $Y_2SiO_5:Tb$ or $LaOBr:Tb$, should be made possible in this manner.

The use of two pigments whose absorption edges are at a specific distance from each other also enable a transmission window to be defined. In particular for phosphors emitting in a narrow band, such as $Y_2SiO_5:Tb$ or $LaOBr:Tb$, an inventive pigment can be combined with a bluish-green pigment to form an optimum green pigment.

Dependent upon the particle size of the pigment used to manufacture the color-filter layers, said layers are transparent or non-transparent. Pigments whose particle size is small enough to form transparent layers can also be used for lacquers and inks.

The solid-solution pigments are manufactured by forming solid solutions from the basic compounds $Ga_2S_3$ and $In_2S_3$, and if necessary from other components such as ZnS, ZnSe, ZnTe, $Ga_2Se_3$, $Ga_2Te_3$, $In_2Se_3$, $In_2Te_3$, $Al_2S_3$ and $Al_2O_3$. At an elevated temperature, these starting compounds form a series of solid solutions which are substantially free of lattice vacancies. The starting material $\beta$-$Ga_2S_3$ is formed by subjecting freshly precipitated $Ga_2S_3$ to suitable calcining processes, or it is recovered directly from the elements by conversion. $In_2S_3$ is obtained in the same manner.

The solid-solution pigments can be obtained by joint precipitation of the starting chalcogenides in the desired molar ratio from an aqueous solution or by mixing and sintering of the solid starting chalcogenides. The desired pigment is obtained by jointly calcining said chalcogenides at approximately 800° C. For the calcining operation, approximately 50 wt. % of sulphur is added to the pre-mixed starting chalcogenides. The exact quantity of sulphur is to be adapted to the temperature and duration of the calcining process. The mixture is accurately homogenized and, subsequently, calcined while excluding oxygen. This is carried out in a simple manner in a quartz tube which is closed on one side and which is filled, on the open side, with active charcoal which is provided above the pigment mixture. The calcining temperature typically is 800° C., however, it can be varied within the boundaries of the desired phase. The duration of the calcining process is governed by the composition of the mixture, the granularity of the starting chalcogenides and the homogeneity of the mixture, and may range from a few hours to several days. Said calcining process can be accelerated by interrupting the process once or several times to rehomogenize the mixture. The morphology of the pigment particles can be changed within wide limits by varying the parameters of the precipitation and calcination processes. The spectral edge steepness of the pigment obtained is governed by the degree of crystallization, the homogeneity and the concentration of crystal defects and hence also depends on the parameters of the calcining process, such as duration and temperature of the calcining process, atmosphere, impurities etc.

The color display screen in accordance with the invention comprises a coating which is composed of at least one layer containing a pigmented phosphor or at least one phosphor layer and at least one color filter layer containing a color-filter pigment.

To manufacture a pigmented phosphor, a suspension, which is stabilized, if necessary, of the relevant phosphor in water is prepared and the pH is made alkaline. In addition, a suspension of the pigment in the desired quantity as well as a suspension of the binder used, for example, latices, casein, gelatine or similar known binders, are prepared. After mixing the suspensions at a high pH value, the pH value is acidified to destabilize the suspensions. In this process, the pigments and the binder precipitate on the surface of the phosphor particles. The isolated, pigment-coated phosphor powder is then dried and, if necessary, subjected to a temperature treatment, which is adapted to the binder used, to cure said binder. Alternatively, the sulphidic pigments in accordance with the invention can be precipitated directly onto the surface of the phosphor particles by means of homogeneous precipitation using thioacetamide.

To manufacture the color display screen, the glass of the display screen is first provided, if necessary, with the pattern of a black matrix by means of a photolithographic process. Subsequently, the rasters of the three primary colors blue, red and green are provided in three successive photolithographic steps in accordance with known methods, while using suspensions of pigmented phosphors. The phosphors may alternatively be provided in a printing process.

If color filter layers are provided between the glass of the color display screen and the phosphor layers, the phosphors are not pigmented, but instead a layer of the pigment in accordance with the invention and the phosphor are provided, together or separately, onto the screen glass so that said layer is positioned between the screen glass and the corresponding phosphor raster. Said layer can be provided photolithographically, while using suspensions of the color filter pigments in accordance with the invention or by means of printing.

In all cases, the finished color display screen coating which comprises all three colors and, if necessary, color filter layers, and which is suitable for normal applications in color display tubes or color monitors, is provided with an aluminium film on the rear side and finally mounted onto the finished tube.

EXEMPLARY EMBODIMENT 1

Manufacture of $Ga_2S_3$ and $In_2S_3$.

A quantity of 600 g $Ga_2O_3$ are dissolved in 25% nitric acid at a high temperature. After cooling of the solution, ammonia is stirred into said solution until a pH value of 2.7 is achieved. $H_2S$ is introduced into the clear solution, the pH value decreasing in the course of the precipitation process. If a pH value of 1.8 is attained, ammonia is used to increase said value to pH=2.7. This cycle is repeated until the precipitation of $Ga_2S_3$ ceases. After filtering, washing with 0.04% nitric acid (pH=2) and drying in vacuum at 130° C., a quantity of 450 g $Ga_2S_3$ is obtained.

Precipitation of $In_2S_3$ takes place in an analogue manner, however, the pH range for the precipitation lies between pH=1 and pH=1.3.

EXEMPLARY EMBODIMENT 2

$In_2S_3$ comprising 10 mol % $Ga_2S_3$.

A quantity of 11.78 g of untreated, freshly precipitated $Ga_2S_3$ are thoroughly mixed with 146.63 g of freshly precipitated, fine-grained $In_2S_3$ and with 16 g of sulphur powder. This mixture is heated, while excluding oxygen, (preferably in a quartz tube which is closed on one side and which is filled with active charcoal on the open side) for 6 hours to 800° C. Dependent upon the degree of fineness of the starting components and upon the degree of mixing, a longer calcining process may be required. A red powder is obtained having a $\beta$-$In_2S_3$ structure whose optical absorption edge is shifted towards the short wavelength range by approximately 10 nm as compared to pure $\beta$-$In_2S_3$. Said powder can suitably be used, in particular, as a color filter in combination with the red-emitting cathode-ray phosphor $Y_2O_2S$:Eu.

EXEMPLARY EMBODIMENT 3

$In_2S_3$ comprising 33 mol % $Ga_2S_3$ ($Ga_2In_4S_9$).

Figure 2:
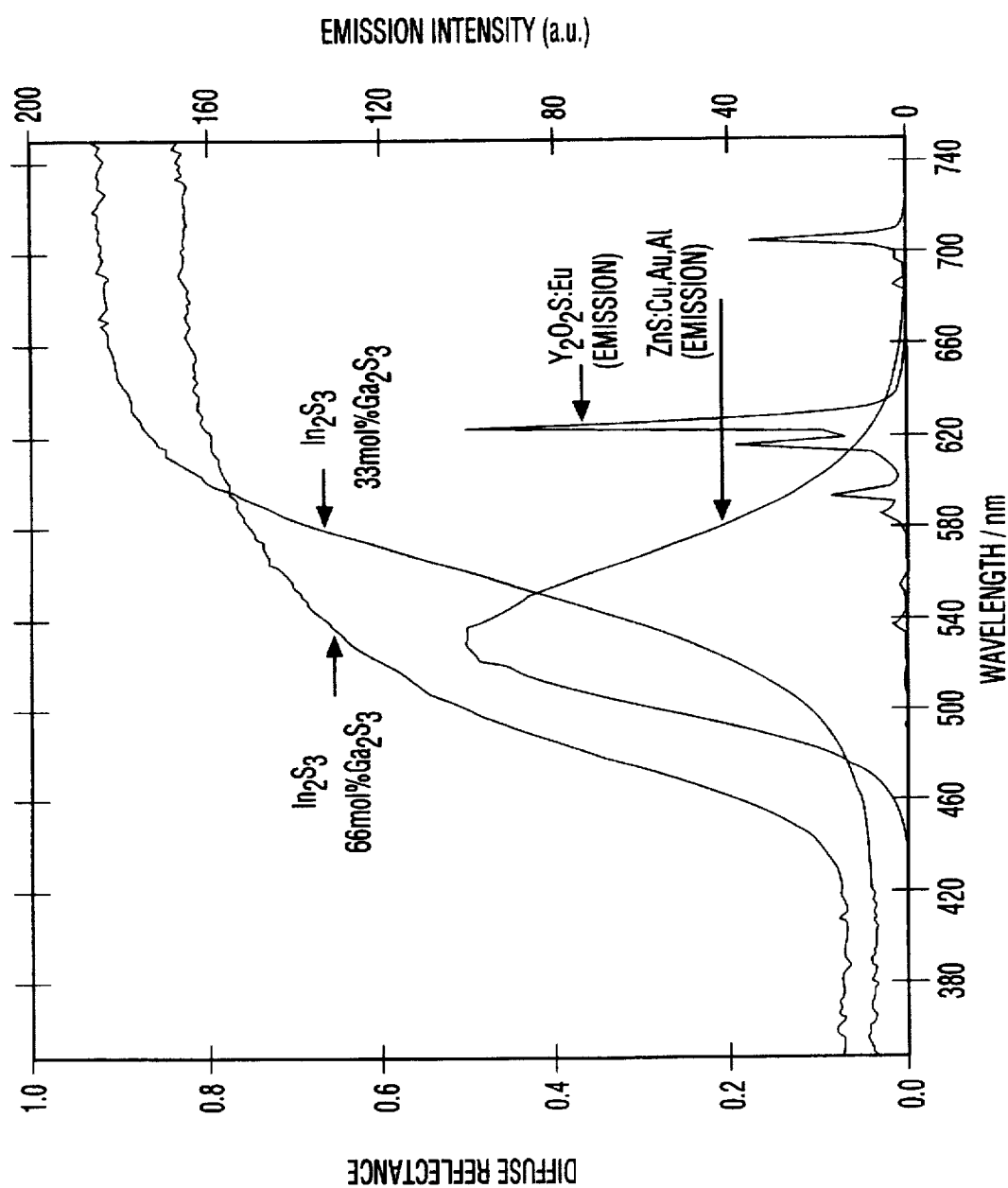
FIG. 2 shows the emission spectra of the green phosphor ZnS:Cu,Au,Al and of the red phosphor $Y_2O_2S$:Eu as well as the reflection spectra of two further solid-solution pigments in accordance with the invention.

A quantity of 38.88 g of untreated, freshly precipitated $Ga_2S_3$ are thoroughly mixed with 107.5 g of freshly precipitated, fine-grained $In_2S_3$ and with 15 g of sulphur powder. This mixture is heated, while excluding oxygen, (preferably in a quartz tube which is closed on one side and which is filled with active charcoal on the open side) to 800° C. for 6 h. Dependent upon the degree of fineness of the starting components and upon the degree of mixing, a longer calcining process may be necessary. An orange powder is obtained having the structure of the (known) compound $Ga_2In_4S_9$ whose optical absorption edge is shifted in the direction of the short wavelength range by 45 nm as compared to pure $\beta$-$In_2S_3$. Said powder can suitably be used, in particular, as a color filter in combination with red-emitting cathode-ray phosphors. FIG. 2 shows the corresponding spectrum of the diffuse reflectance. The exact position of the absorption edge can be adapted to the system requirements by varying the $Ga_2S_3$ content.

EXEMPLARY EMBODIMENT 4

$In_2S_3$ comprising 66 mol % $Ga_2S_3$.

A quantity of 77.76 g of untreated, freshly precipitated $Ga_2S_3$ is thoroughly mixed with 53.76 g of freshly precipitated, fine-grained $In_2S_3$ and with 13 g of sulphur powder. This mixture is heated, while excluding oxygen, (preferably in a quartz tube which is closed on one side and which is filled with active charcoal on the open side) to 800° C. for 6 hours. Dependent upon the degree of fineness of the starting components and the degree of mixing, a longer calcining process may be necessary. A yellow powder is obtained having the structure of $\alpha$-$Ga_2S_3$ whose optical absorption edge is shifted in the direction of the short wavelength range by approximately 110 nm as compared to pure $\beta$-$In_2S_3$. Said powder can suitably be used, in particular, as a color filter in combination with green-emitting cathode-ray phosphors Such as ZnS:Cu,Au,Al or $Y_2SiO_5$:Tb. FIG. 2 shows the corresponding spectrum of the diffuse reflectance. The exact position of the absorption edge can be adapted to the system requirements by varying the $Ga_2S_3$ content.

We claim:

1. A color display screen having a coating which comprises at least a green and/or a red phosphor as well as at least a pigment having the following composition:

$$Ga_aIn_bZn_cAl_dO_nS_mSe_oTe_p$$

wherein 0.05<a<1.95    0.0≦n<0.3
0.05<b<1.95    2.1<m≦3
0.00≦c<0.09    0.0≦o<0.3
0.00≦d<0.2     0.0≦p<0.3
and n+m+o+p=3 and a+b+c+d=2.

2. A color display screen as claimed in claim 1, characterized in that the phosphor has a phosphor coating which contains the pigment.

3. A color display screen as claimed in claim 1, characterized in that the coating of the display screen comprises at least a phosphor layer containing a green and/or a red phosphor and at least a color-filter layer containing the pigment.

4. A phosphor preparation containing a green and/or a red phosphor and a phosphor coating containing a pigment having the composition

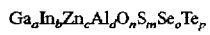

wherein
0.05<a<1.95  0.0≦n<0.3
0.05<b<1.95  2.1<m≦3
0.00≦c<0.09  0.0≦o<0.3
0.00≦d<0.2  0.0≦p<0.3
and n+m+o+p=3 and a+b+⅔c+d=2.

5. A phosphor preparation as claimed in claim 4, characterized in that the phosphor is a green phosphor, and the phosphor coating contains a pigment having the composition

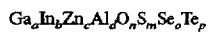

wherein
0.80<a<1.60  0.0≦n<0.3
0.40<b<1.80  2.1<m≦3
0.00≦c<0.09  0.0≦o<0.3
0.00≦d<0.2  0.0≦p<0.3
and n+m+o+p=3 and a+b+⅔c+d=2.

6. A phosphor preparation as claimed in claim 5, characterized in that the green phosphor has the composition ZnS:Cu,Al,Au and the pigment has the composition

wherein
1.20<a<1.40  0.0≦n<0.3
0.60<b<0.80  2.1<m≦3
0.00≦c<0.09  0.0≦o<0.3
0.00≦d<0.2  0.0≦p<0.3
and n+m+o+p=3 and a+b+⅔c+d=2.

7. A phosphor preparation as claimed in claim 5, characterized in that the green phosphor has the composition ZnS:Cu,Al, and the pigment has the composition

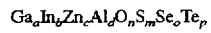

wherein
1.40<a<1.50  0.0≦n<0.3
0.50<b<0.60  2.1<m≦3
0.00≦c<0.09  0.0≦o<0.3
0.00≦d<0.2  0.0≦p<0.3
and n+m+o+p=3 and a+b+⅔c+d=2.

8. A phosphor preparation as claimed in claim 4, characterized in that the phosphor is a red phosphor, and the pigment has the composition

wherein
0.05<a<1.60  0.0≦n<0.3
1.40<b<1.95  2.1<m≦3
0.00≦c<0.09  0.0≦o<0.3
0.00≦d<0.2  0.0≦p<0.3
and n+m+o+p=3 and a+b+⅔c+d=2.

9. A phosphor preparation as claimed in claim 8, characterized in that the phosphor is a red phosphor having the composition Y₂O₂S:Eu, and the pigment has the composition

wherein
0.05<a<0.25  0.0≦n<0.3
1.75<b<1.95  2.1<m≦3
0.00≦c<0.09  0.0≦o<0.3
0.00≦d<0.2  0.0≦p<0.3
and n+m+o+p=3 and a+b+⅔c+d=2.

10. A method of coloring inorganic matter, lacquers, synthetic and natural resins and inks, the method comprising the use of $Ga_aIn_bZn_cAl_dO_nS_mSe_oTe_p$, wherein 0.05<a<1.95  0.0≦n<0.3
0.05<b<1.95  2.1<m≦3
0.00≦c<0.09  0.0≦o<0.3
0.00≦d<0.2  0.0≦p<0.3 as a pigment.

* * * * *